(12) United States Patent
Kitano (10) Patent No.: US 7,684,056 B2
(45) Date of Patent: Mar. 23, 2010

(54) LIGHT DETECTING METHOD AND LIGHT DETECTING APPARATUS

(75) Inventor: Shogo Kitano, Yokosuka (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 372 days.

(21) Appl. No.: 11/781,295

(22) Filed: Jul. 23, 2007

(65) Prior Publication Data
US 2008/0037007 A1    Feb. 14, 2008

(30) Foreign Application Priority Data
Aug. 10, 2006    (JP) ............................. 2006-218481

(51) Int. Cl.
*G01N 21/00* (2006.01)
*G01B 11/00* (2006.01)

(52) U.S. Cl. ..................... 356/614; 356/388; 356/390; 356/394

(58) Field of Classification Search ......... 356/614–624, 356/388–398, 239.1, 239.2; 438/42–43; 382/115, 118, 154; 435/127
See application file for complete search history.

(56) References Cited

U.S. PATENT DOCUMENTS

| | | | | |
|---|---|---|---|---|
| 4,704,627 A | * | 11/1987 | Yuyama et al. | ................ 348/43 |
| 5,305,092 A | * | 4/1994 | Mimura et al. | ............... 356/609 |
| 6,026,319 A | * | 2/2000 | Hayashi | ...................... 600/476 |
| 6,034,766 A | * | 3/2000 | Sugiura et al. | ............ 356/239.1 |
| 6,412,956 B2 | * | 7/2002 | Fujita et al. | .................. 353/122 |
| 7,561,723 B2 | * | 7/2009 | Goldberg et al. | ............ 382/115 |

FOREIGN PATENT DOCUMENTS

| | | |
|---|---|---|
| JP | 2000-097629 | 4/2000 |
| JP | 2002-20693 | 7/2002 |

* cited by examiner

*Primary Examiner*—Sang Nguyen
(74) *Attorney, Agent, or Firm*—Young Basile (57) ABSTRACT

A light detecting method and apparatus wherein non-projection imaging operation of a predetermined range is carried out once within a non-projection imaging operation time thereby to obtain background information. During a remaining time after the non-projection imaging operation, light is radiated. At least two imaging operations of a predetermined range are performed thereby to acquire projection information. Information on the radiated light is extracted based on the background information and the projection information. Accordingly, the dead time that may occur before extraction of reflected light can be suppressed.

12 Claims, 9 Drawing Sheets

LIGHT DETECTING METHOD AND LIGHT DETECTING APPARATUS

CROSS-REFERENCE TO RELATED APPLICATION

This application claims priority from Japanese Patent Application Serial No. 2006-218481, filed Aug. 10, 2006, which is incorporated herein in its entirety by reference.

TECHNICAL FIELD

The present invention relates to a light detecting apparatus and a light detecting method for radiating light and extracting the radiated light by imaging an area including the radiated light.

BACKGROUND

A conventional light detecting apparatus operates such that a slit light is radiated toward a predetermined range. The light thus radiated is imaged by a CCD or the like, and the image pickup data is processed thereby to measure the distance to or the shape of an object existing in the predetermined range. One example of such an apparatus is disclosed in Japanese Patent Application Laid-Open No. 2000-97629. In that application a light radiation time or a light receiving time is finely adjusted in stages so that a received light amount of pixels of imaging means constitutes an optimum amount below a saturation amount.

BRIEF SUMMARY

Disclosed herein are embodiments of a light detecting apparatus capable of suppressing the dead time that may occur before extraction of reflected light from images. One example of such an apparatus comprises an imaging unit configured to pick up an image, a projector configured to radiate light in a predetermined range of the image, a first storage unit configured to store background information acquired by at least one imaging operation in the predetermined range with no light radiated, a second storage unit configured to store projection information acquired by at least two imaging operations in the predetermined range with the light radiated and a light reception processor configured to extract radiated light from the projection information based on the background information stored in the first storage unit and the projection information stored in the second storage unit.

Another example of such a light detecting apparatus comprises means for picking up an image, means for radiating light in a predetermined range of the image, first storage means for storing background information acquired by at least one imaging operation in the predetermined range with no light radiated, second storage means for storing projection information acquired by at least two imaging operations in the predetermined range with the light radiated and light processor means for extracting radiated light from the projection information based on the background information stored in the first storage means and the projection information stored in the second storage means.

Also disclosed is a light detecting method capable of suppressing the dead time which may occur before extraction of reflected light. One such method comprises, by example, picking up an image, radiating light in a predetermined range of the image, storing projection information acquired by at least one imaging operation in the predetermined range with no light radiated, storing the background information acquired by at least two imaging operations in the predetermined range with light radiated and extracting radiated light from the projection information based on the background information and the light projection information.

BRIEF DESCRIPTION OF THE DRAWINGS

The description herein makes reference to the accompanying drawings wherein like reference numerals refer to like parts throughout the several views, and wherein.

DETAILED DESCRIPTION OF EMBODIMENTS OF THE INVENTION

In Japanese Patent Application Laid-Open No. 2000-97629 described above, in the transfer from projection imaging operation to non-projection imaging operation or from non-projection imaging operation to projection imaging operation, the next imaging operation is performed until a predetermined imaging time elapses even in the case where the current imaging operation is completed, and the received light amount is accumulated to increase the received light amount of the projection imaging operation. Therefore, time is wasted before the reflected light is extracted.

In contrast, the invention provides teachings capable of suppressing the dead time that may occur before extraction of reflected light. For example, a non-projection imaging operation can be performed once in a predetermined range for the non-projection imaging time thereby to acquire background information. At least two imaging operations can be performed in the predetermined range by radiating light for a remaining time after the non-projection imaging operation thereby to acquire projection information. Accordingly, the radiated light is extracted based on the background information and the projection information. The dead time that may occur before extraction of reflected light is thereby suppressed Certain embodiments of the invention are explained below with reference to FIGS. 1 to 10.

Figure 2:
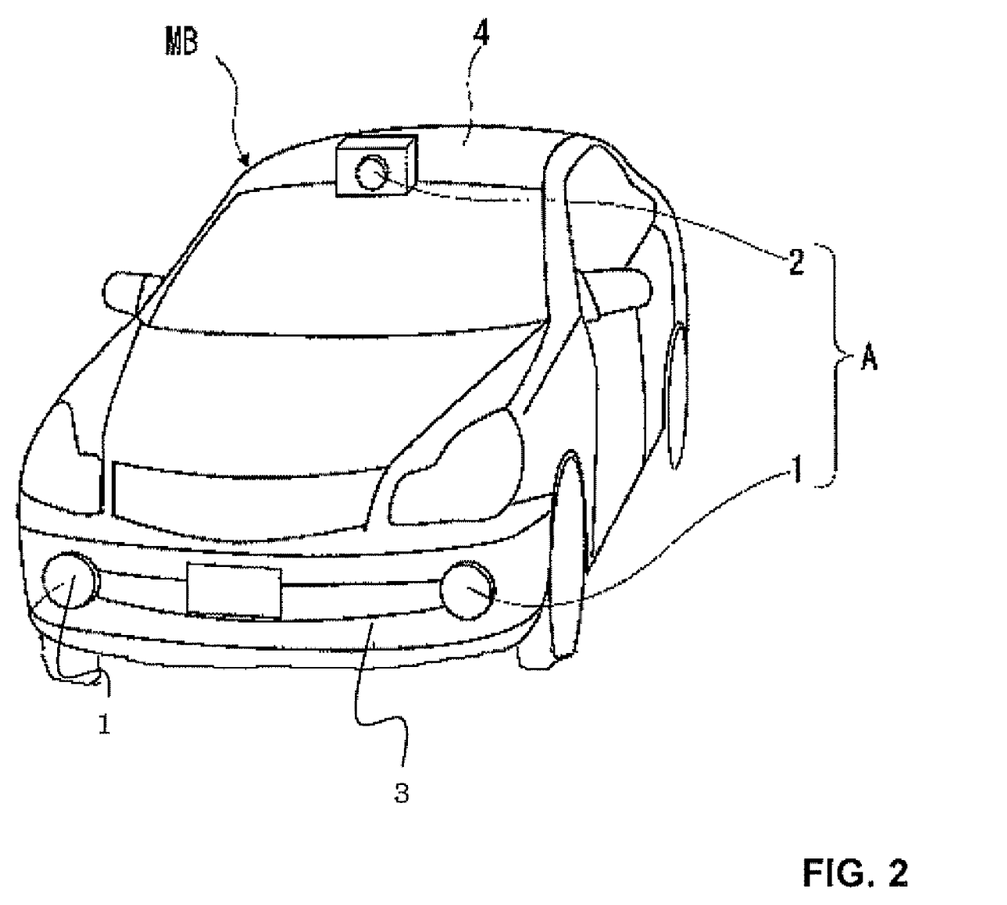
FIG. 2 is a perspective view showing a distance measuring device A using the light detecting apparatus according to the embodiment of the invention and a vehicle MB carrying the distance measuring device A.

A light detecting apparatus as shown in FIG. 2 is used for a distance measuring device A mounted on an automotive vehicle MB. The distance measuring device A is for measuring a distance from an object M (see FIG. 5) existing in a detection target area (predetermined range) ahead of the vehicle MB and includes a pair of projectors 1 and a camera 2. The pair of projectors 1 can be mounted on the left and right sides in the lower part of a front bumper 3 of the vehicle MB, and the camera 2 can be mounted in the neighborhood of a rear view mirror on the back of the central front end portion of a roof 4 of the vehicle MB.

Figure 3:
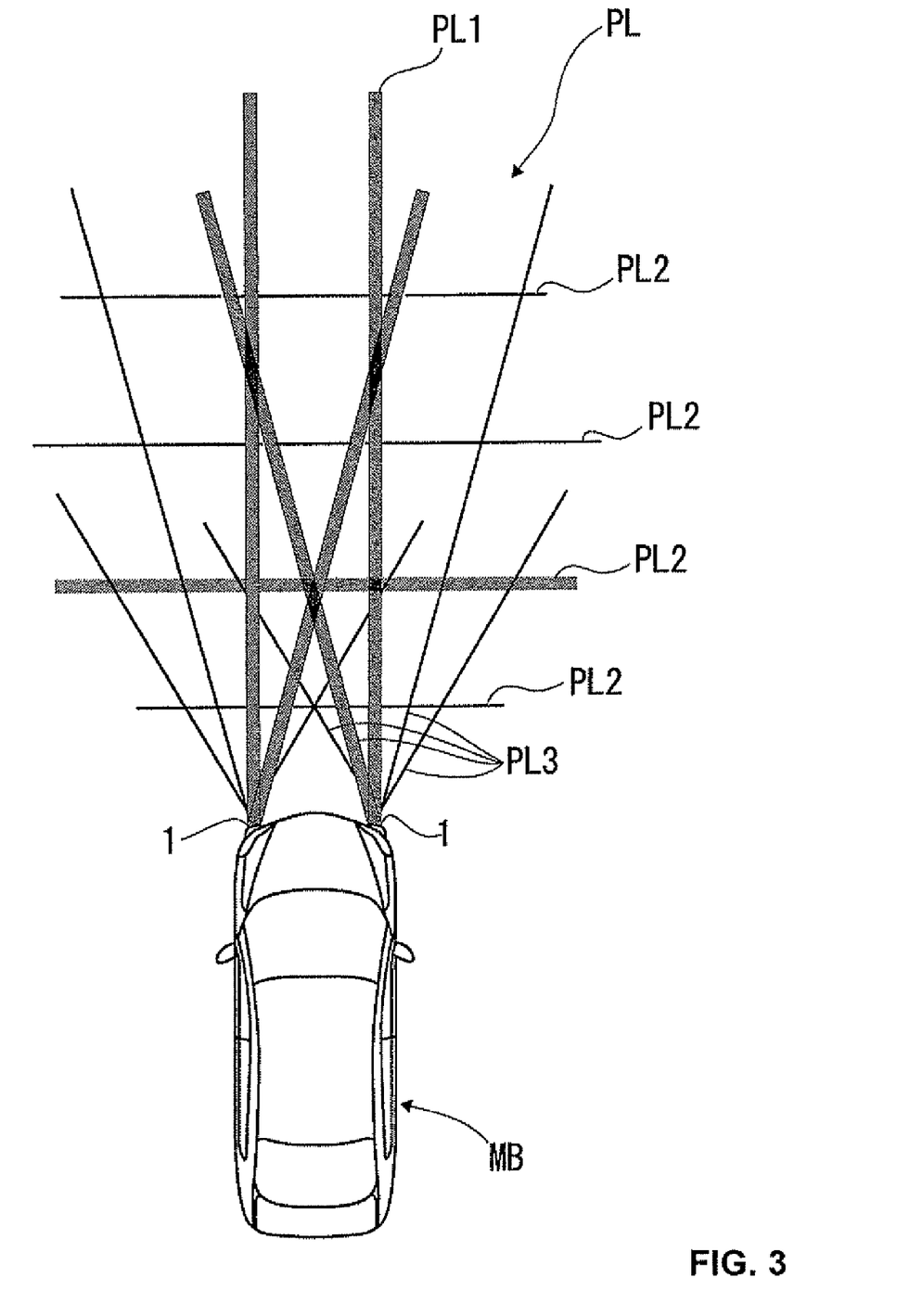
FIG. 3 is a plan view showing light PL radiated from the light detecting apparatus according to the embodiment of the invention.
Figure 4:
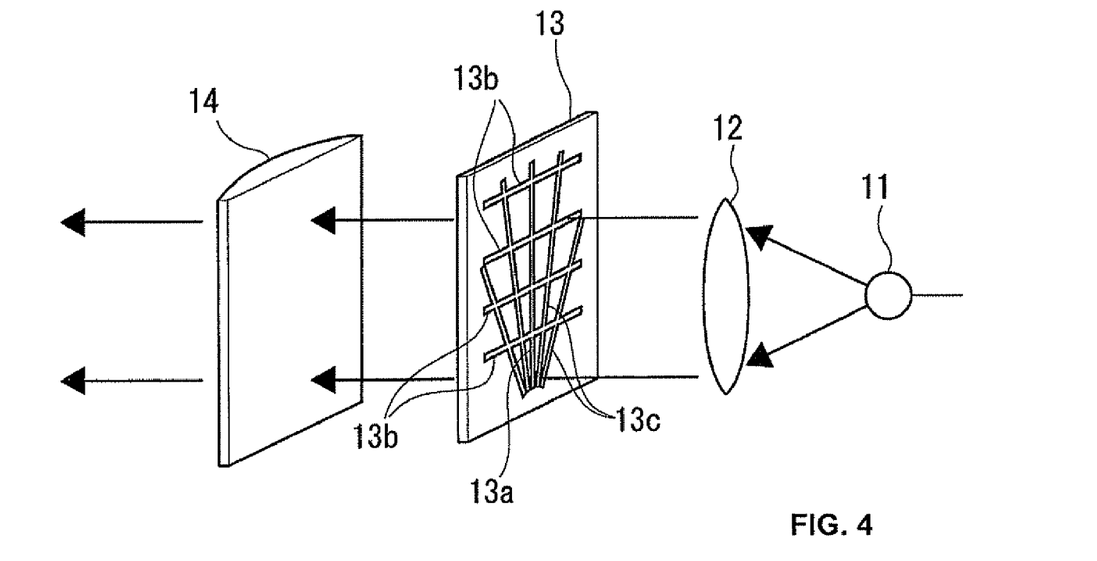
FIG. 4 is a diagram for briefly explaining a structure of a projector 1 of the light detecting apparatus according to the embodiment of the invention.

The projectors 1 are configured to radiate light PL having a plurality of slit light rays PL1-PL3 shown in FIG. 3 adapted to be radiated in a direction ahead of the vehicle. As shown in FIG. 4 each projector 1 can include a light source 11, a lens 12, a slit plate 13 and a lens 14 arranged in that order.

The slit plate 13, which is configured to radiate the radiation light PL in the shape shown in FIG. 3 including a plurality of slight light rays, has a vertical slit 13a extending in vertical direction, a plurality of horizontal slits 13b extending in the direction perpendicular to the vertical slit 13a, and diagonal slits 13c obliquely crossing the vertical and horizontal slits 13a, 13b as shown in FIG. 4.

As shown in FIG. 3, in this embodiment of the disclosure each projector 1 radiates a vertical light ray PL1 extending forward of the vehicle, four horizontal light rays PL2 extending substantially horizontally in front of the vehicle and four diagonal light rays PL3 extending substantially obliquely to cross the vertical light ray PL1. Together, light rays PL1, PL2 and PL3 form the radiation light PL. The horizontal light rays PL2 radiated from the left and right projectors 1, respectively, can be arranged equidistantly from the vehicle MB, and each can form a continuous straight line.

Figure 5:
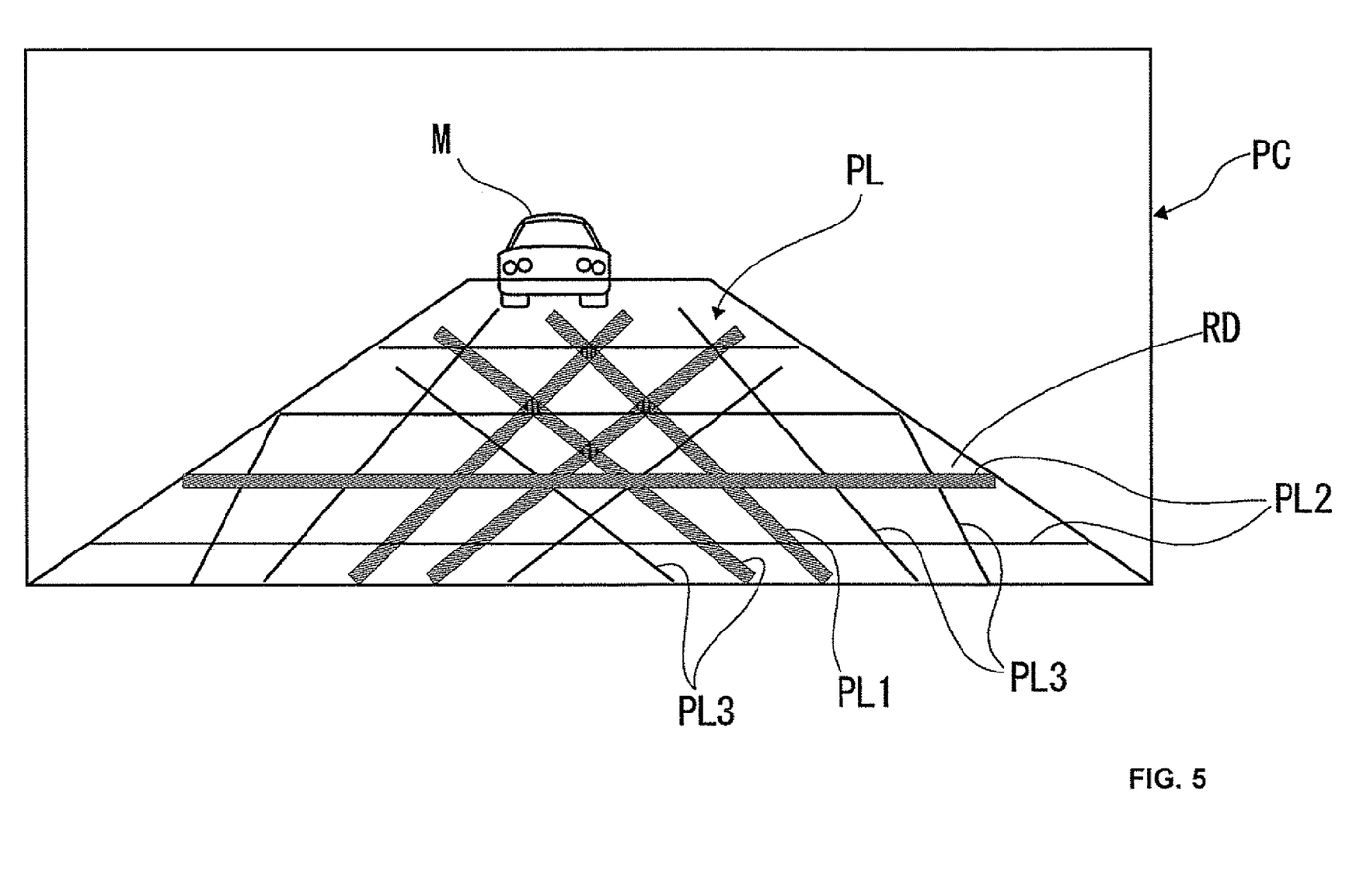
FIG. 5 is a diagram for explaining a radiated light image PC picked up by a camera 2 of the light detecting apparatus according to the embodiment of the invention.

Referring again to FIG. 2, the camera 2 can pick up a brightness image using an image pickup element (pixel) such as a charge coupled device (CCD) or a complementary metal oxide semiconductor (CMOS) to pick up an image of an area in front of the vehicle. This area constitutes a detection target area. FIG. 5 shows an exemplary imaging operation executed by the camera 2. This example shows a state in which the light PL is radiated on a road RD whose image PC is picked up and on which an object M exists. The image PC picked up with the light PL radiated as shown by example in FIG. 5 is hereinafter referred to as a radiated light image.

Figure 1:
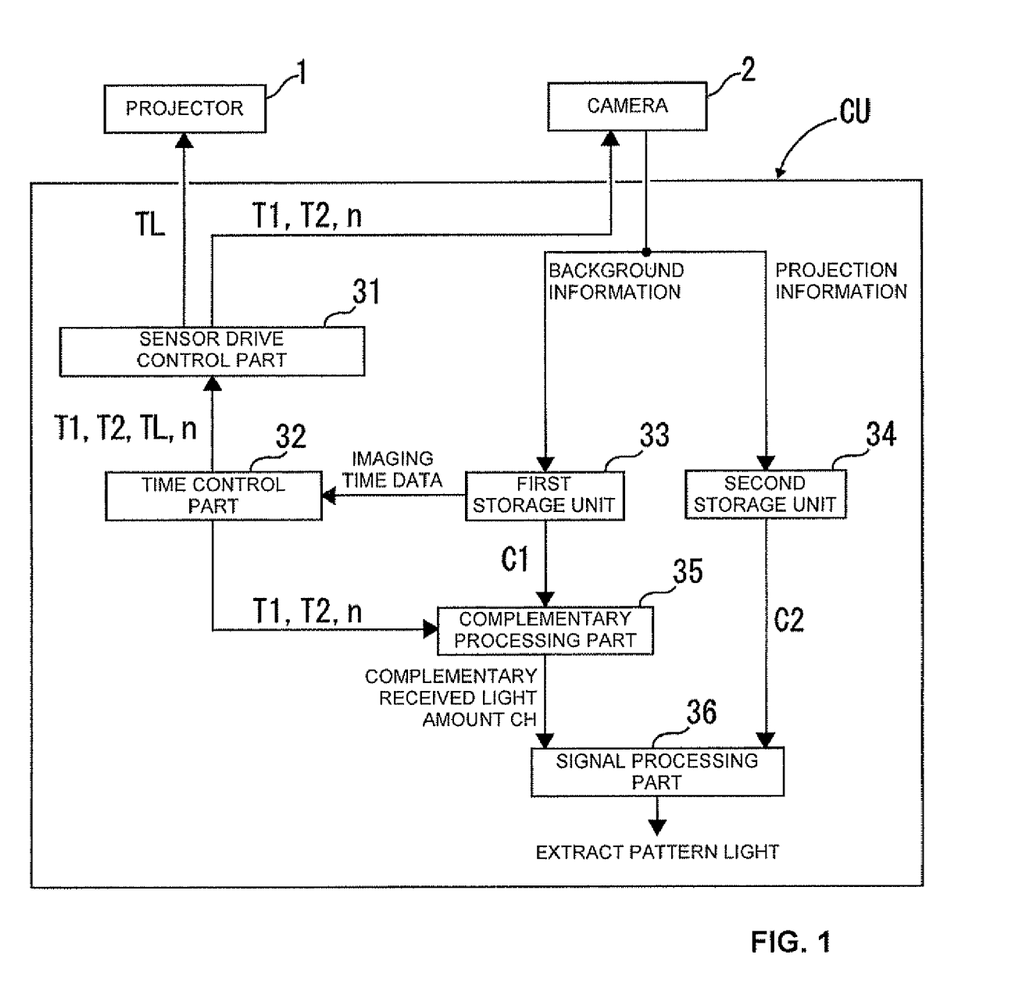
FIG. 1 is a block diagram showing a part corresponding to a light detecting apparatus according to an embodiment of the invention.

Information obtained by the imaging operation of the camera 2 is input to a control unit CU for performing light reception processing. One example of such a control unit CU is shown in FIG. 1. The control unit CU is supplied with a signal from an on-vehicle sensor including the camera 2 to detect an object and measures a distance to the object. The control unit CU has a well-known configuration in that it can be, for example, a microcomputer including a random access memory (RAM), a read-only memory (ROM) and a central processing unit (CPU) in addition to various input and output connections. Generally the functions described herein for the control unit CU are performed by execution by the CPU of one or more programs stored in ROM. The parts of the control unit CU shown in FIG. 1 and described below represent functional components of the one or more programs. Of course, some or all of the functions described can also be implemented in whole or in part by hardware.

As shown in FIG. 1, the control unit CU includes sensor drive control part 31 for controlling the radiating operation of the projectors 1 and the imaging operation of the camera 2. Based on time control operation of time control part 32, the sensor drive control part 31 controls a light radiation start timing and a light radiation time of the projectors 1, and a timing of the imaging operation and an imaging time of the camera 2.

The execution timing control operation for the projection operation and the imaging operation by the time control part 32 is explained briefly. The imaging operation is performed in a predetermined cycle. According to this embodiment, the camera 2 is a so-called high-speed frame camera that can pick up images at a rate of 30 to 1000 per second (i.e., 30 to 1000 frames per second). Other known cameras can be used.

Figure 6:
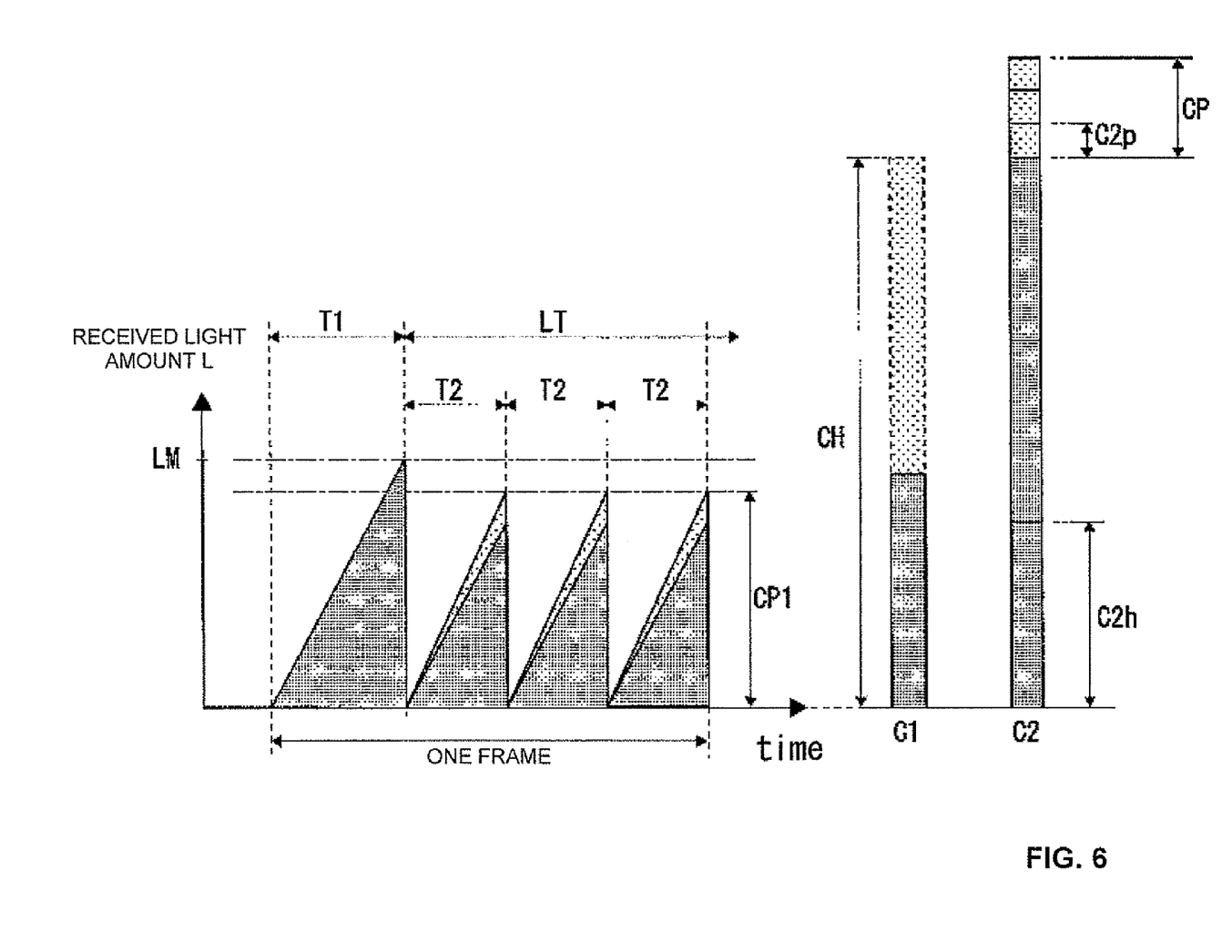
FIG. 6 includes diagrams for explaining a relation among a background imaging time T1, a radiated light imaging time T2, received light amounts C1, C2 and a complementary received light amount CH with a high background light amount level in the light detecting apparatus according to the embodiment of the invention.

FIG. 6 shows a relation among a background imaging time T1 and a projection imaging time T2 in one frame and a received light amount L. As shown in FIG. 6, the received light amount L increases in proportion to each imaging time T1, T2. The time control part 32 thus sets the length of each imaging time T1, T2 to perform the imaging operation with a received light amount not reaching a saturated received light amount LM at which the imaging element is saturated at the time of the imaging operation.

The background imaging time T1 is defined as a time required to pick up a background image, and the projection imaging time T2 is defined as a time required to pick up a radiated light image PC. The background image is defined as an image of the detection target area picked up without radiation of the radiation light PL, and imaging information obtained by picking up the background image is referred to as background information herein.

The radiated light image PC, as described above, is defined as an image of the detection target area picked up with the light PL radiated, i.e., an image of the background image superposed with the radiated light PL (see FIG. 5). The imaging information obtained by picking up the radiated light image PC is referred to as projection information herein. In the example shown in FIG. 6, the radiated light imaging time T2 is set three times, and the radiated light image PC is picked up three times.

During a time LT (remaining time) after the lapse of the background imaging time T1 in one frame, the light PL is radiated from the projectors 1. The time LT during which the light PL is radiated is referred to as projection time herein.

The background imaging time T1 is set based on the background imaging time T1 in the previous frame and the received light amount L of the background image in such a manner that the received light amount L is smaller than the saturated received light amount LM. Also, the background imaging time T1 is set not to exceed one half of a frame at maximum.

The radiated light imaging time T2, on the other hand, is set based on the received light amount of the background image (i.e., the brightness (1×) of the external world). Specifically, as indicated by the imaging frequency characteristic shown in FIG. 7, the number of times N of imaging operation (imaging frequency) of the radiated light image PC is set in accordance with the brightness (1×) of the external world according to this embodiment. The time control part 32 divides the projection time LT in one frame by the number of times N of imaging operation obtained based on the imaging frequency characteristic shown in FIG. 7, and sets the time thus obtained as the radiated light imaging time T2.

Figure 7:
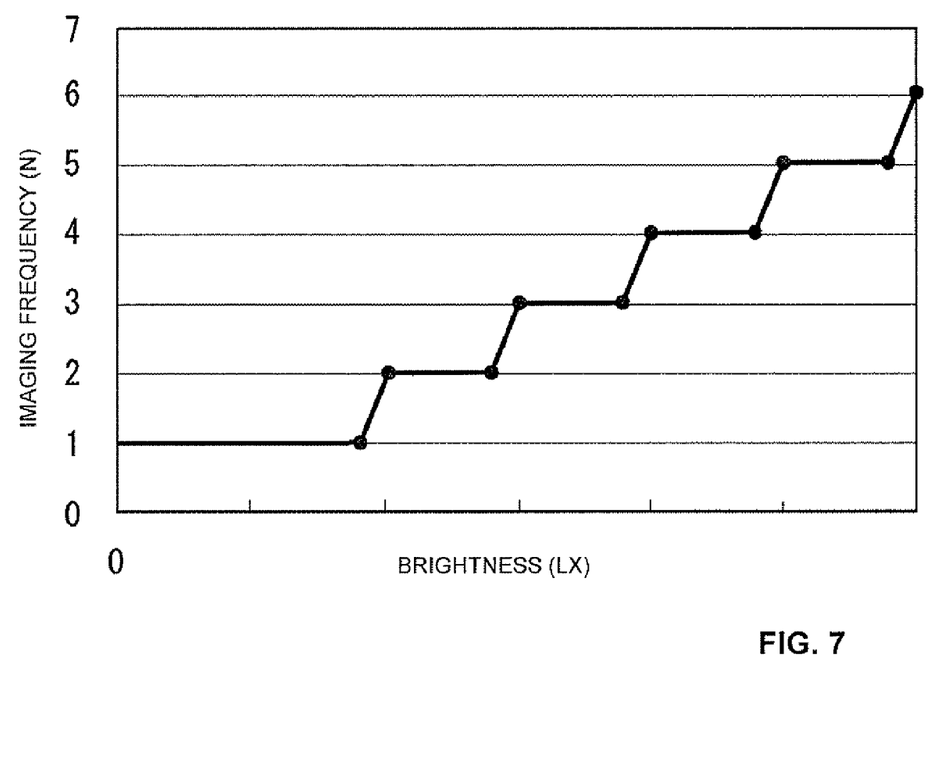
FIG. 7 is a diagram showing the characteristic of the imaging frequency of the radiated light image in the light detecting apparatus according to the embodiment of the invention.

The imaging frequency characteristic is so set that the higher the brightness (1×) of the external world, the larger the number of times N of imaging operation, and vice versa. In this example, in the darkest state N assumes the value of 1, and in the brightest state N assumes the value of 6. Also, the number of times N of imaging operation is set in such a manner as to calculate the radiated light imaging time T2 with which the received light amount including the background image and the radiated light PL may not exceed the saturated received light amount LM.

Returning to FIG. 1, the background information and the projection information obtained by the imaging (light receiving) operation of the camera 2 are temporarily stored in a first storage unit 33 and a second storage unit 34, respectively. The background information and the projection information are processed by a complementary processing part 35 and a signal processing part 36 so that the radiated light PL is extracted.

The complementary processing part 35 calculates the complementary received light amount CH corresponding to the background image in the radiated light image PC. Specifically, assuming that the radiated light image PC is picked up three times as shown in the example of FIG. 6, the received light amount C2 obtained by accumulating the received light amounts CP1 of the radiated light images PC is equal to the sum of the value three times a received light amount C2h corresponding to the background image and the value three times a received light amount C2p corresponding to the radiated light PL.

The complementary processing part 35 calculates the complementary received light amount CH as a received light amount equal to three times the received light amount C2h corresponding to the background image. The received light amount C2h corresponding to the background image for the radiated light imaging time T2 can be determined based on the received light amount C1 for the background imaging time T1. Specifically, the relation holds that T1/T2=C1/C2h, and therefore, C2h can be determined as T2×C1/T1. Thus, the complementary received light amount CH can be determined as C2h×N. In this way, the complementary processing part 35 determines the complementary received light amount CH based on the imaging time T1, T2, the number of times N of imaging operation of the radiated light image PC and the received light amount C1.

In the signal processing part 36, the received radiation light amount CP is obtained by subtracting the complementary received light amount CH from the received light amount C2 as an accumulation of the received light amount of the radiated light image PC. This is determined based on the complementary received light amount CH obtained from the complementary processing part 35 and the radiated light image information stored in the second storage unit 34.

This process is executed for each imaging element. By extracting the pixels having the received radiation light amount CP, the point to which the light PL is radiated can be extracted.

Based on the relative positions of the radiated light PL on the image thus extracted and the object M detected on the image, the control unit CU measures the relative position of the object M. Measurement of the relative positions is known in the art and is thus not explained in detail. Briefly, however, the projectors 1 and the camera 2 are arranged at preset positions, and as shown in FIG. 5, the positions of the light rays PL1, PL2, PL3 relative to the vehicle MB with the light PL radiated ahead of the vehicle are known in advance. Therefore, the actual position of the object M can be measured based on the relative positions of the object M and the radiated light PL on the image.

Figure 8:
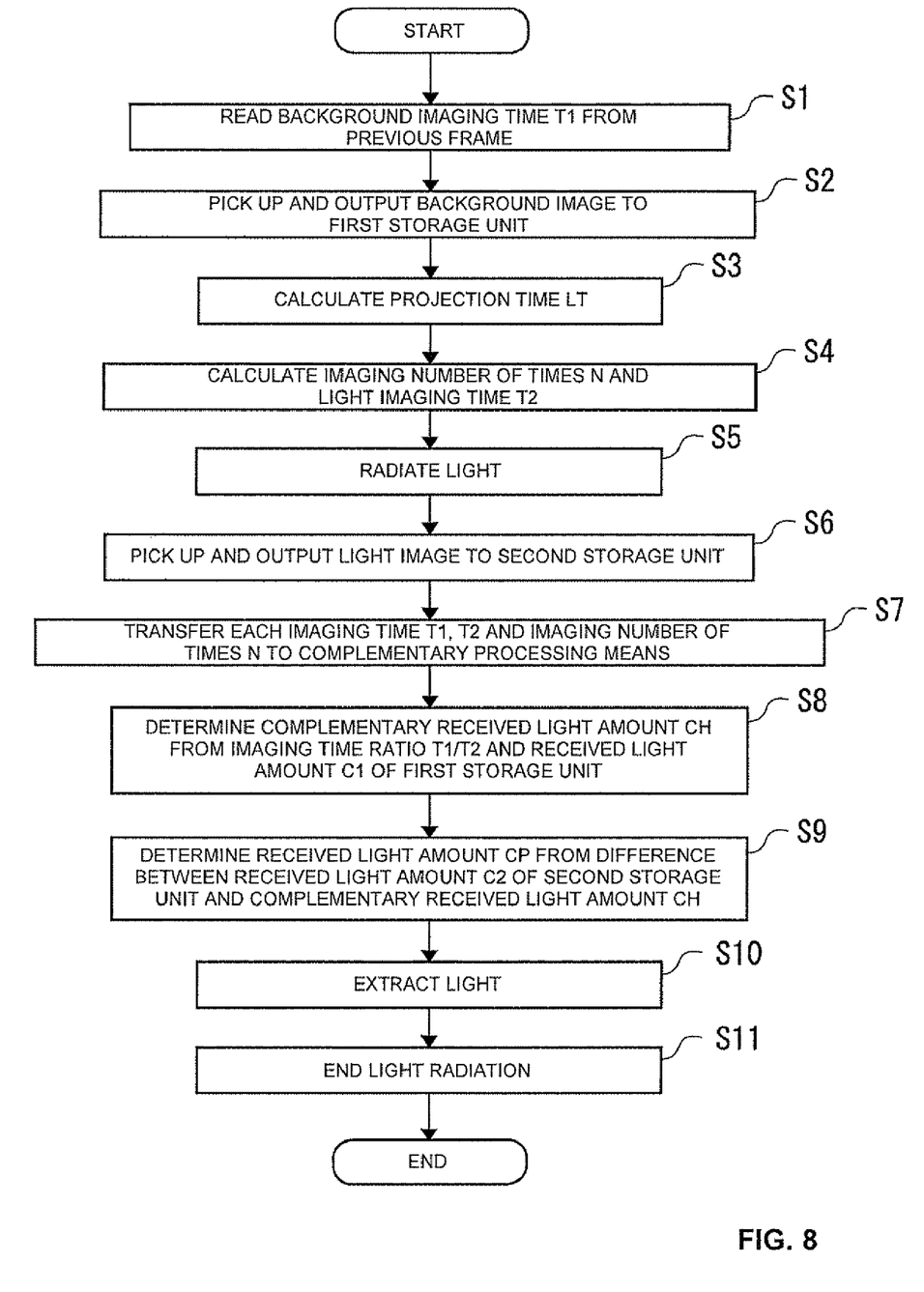
FIG. 8 is a flowchart showing a processing flow in a control unit of the light detecting apparatus according to the embodiment of the invention.

Next, the operation of the embodiment described above is explained with reference to the flowchart of FIG. 8.

In step S1 the time control part 32 calculates the background imaging time T1 based on the background image information of the previous frame stored in the first storage unit 33.

Figure 9:
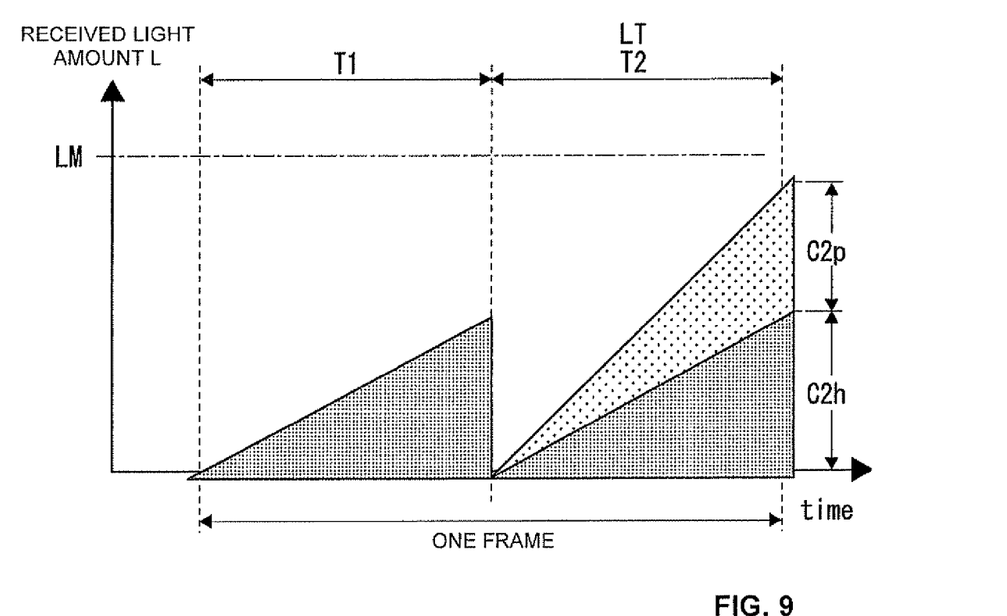
FIG. 9 is a diagram for explaining an exemplary imaging operation with a low background light amount level in the light detecting apparatus according to the embodiment of the invention.

In step S2 the camera 2 picks up the background image in the background imaging time T1. The background image information thus picked up is stored in the first storage unit 33. In a case where the background image is low in light amount level the background imaging time T1 is lengthened and reaches one half of a frame at maximum as shown in FIG. 9. On the other hand, in a case where the light amount level of the background image is high the background imaging time T1 is shortened as shown by example in FIG. 6.

In step S3 the time control part 32 calculates the remaining time (i.e. the projection time LT) during one cycle (one frame), and in step S4 the time control part 32 calculates the radiated light imaging time T2. In one embodiment, the radiated light imaging time T2 is determined in such a manner that the number of times N of imaging operation of the radiated light image PC is determined based on the imaging frequency characteristic of FIG. 7 in accordance with the received light amount C1 of the background image information stored in the first storage unit 33. The corresponding projection time LT is divided by the number of times N of imaging operation.

In step S5 the sensor drive control part 31 activates the projectors 1 to project the radiated light PL for the projection time LT obtained in step S3 during the remaining time after picking up the background image in one frame.

In step S6 the camera 2 performs the imaging operation the number of times N for the radiated light imaging time T2 with the light PL radiated thereby to pick up "N" radiated light images. The corresponding projection information is stored in the second storage unit 34.

In step S7 the time control part 32 transfers the data including the background imaging time T1, the radiated light imaging time T2 and the number of times N of imaging operation to the complementary processing part 35.

In step S8 the complementary processing part 35 determines the complementary received light amount CH by modifying the received light amount C1 in the background information stored in the first storage unit 33 based on the ratio between the imaging times T1 and T2.

In step S9 the signal processing part 36 determines the received radiation light amount CP constituting a difference between the complementary received light amount CH obtained by the complementary processing part 35 and the received light amount C2 of the radiated light image PC stored in the second storage unit 34.

In step S10, the signal processing part 36 extracts the radiation point of the radiated light PL based on the imaging pixel having the received radiation light amount CP. In step S11, the radiation of the light PL by the projectors 1 is ended.

As explained above, according to this embodiment, a plurality of radiated light images PC are acquired in the case where the background image is large in light amount (bright), and the received light amount C2p corresponding to the radiated light PL in the plurality of radiated light images PC is accumulated to extract the radiated light PL on the image.

Even in the case where the light amount of the radiated light PL is smaller than that of the background or the background light amount undergoes a change, therefore, the radiated light PL can be extracted with higher accuracy without increasing the light amount of the radiated light PL than in the case where the radiated light PL is extracted by picking up the radiated light image PC only once.

As a result, the projectors 1 can be reduced in size, and the radiated light PL on the image can be extracted with high accuracy while at the same time reducing the effect that the radiated light PL has on the external world.

Figure 10:
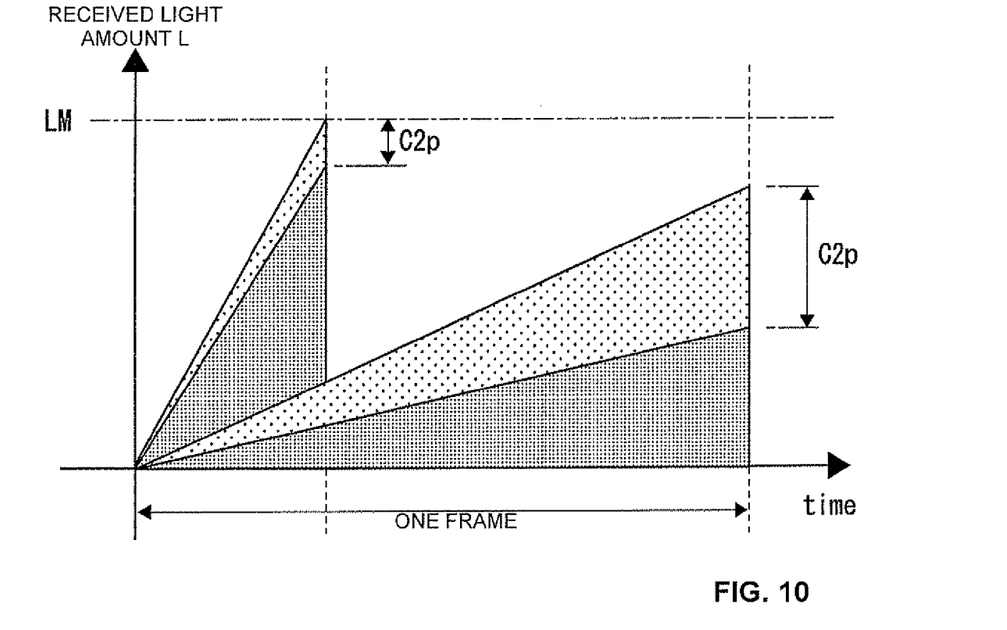
FIG. 10 is a diagram showing a comparative example of the light detecting apparatus according to the embodiment of the invention in the case where one imaging operation is performed in one frame.

Further, the radiated light image PC is picked up utilizing the dead time during which the background image is not picked up in one frame. Specifically, in the case where the background light amount is small, as shown in FIG. 10, the received light amount L does not reach the saturated received light amount LM even if the imaging operation is performed using the entire frame. In the case where the background light amount is large, on the other hand, the received light amount L undesirably would reach the saturated received light amount CM unless the imaging time is shortened. In such a case, time during which no imaging operation is performed is the dead time.

According to this embodiment, the radiated light image PC is picked up utilizing the dead time in the case where the background light amount is large. Therefore, as compared with the case in which the background image and the radiated light image PC are picked up in different frames, both items of the image information can be obtained efficiently within a short time. Also, to obtain the two items of the image information within a short time as described above proves more effective in detecting the object M ahead of the constantly moving vehicle MB. In the case where the background light amount is small, the received light amount $C2p$ corresponding to the radiated light PL sufficient for identification can be obtained even if the background imaging time T1 is one half of a frame.

Additionally, the brighter the background the shorter the background imaging time T1 and the longer the set projection time LT. By increasing the number of times N the radiated light image PC is picked up, therefore, a greater amount of the light corresponding to the radiated light PL can be accumulated. As a consequence, even in the case where the background light amount is large or undergoes a change, the radiated light PL can be extracted with high accuracy. This is advantageous for detection of the object M ahead of vehicle MB, which runs day and night and of which the surrounding environment undergoes a change at short time intervals.

Although the embodiments of the invention described above are applicable to a light detecting apparatus mounted on an automotive vehicle, the invention is not limited to such a case. For example, embodiments of the disclosure are also applicable to other vehicles such as trains and vessels, robots such as industrial robots, security robots and movable devices such as industrial equipment and stationary measuring instruments.

Also, the light radiated from the projection device is not limited to the radiated light PL shown in the embodiment, but a form of light can be radiated in accordance with the equipment, the predetermined range or the object of detection involved. For example, light in the simple form of a lattice may be radiated.

In yet another embodiment, the background information and the projection information can be acquired in different frames, respectively, instead of in one frame as described above. In such a case, either the background information or the projection information can be obtained first.

Also, the projection imaging time T2 may alternatively be determined in accordance with the received light amount of the background information previously acquired, like the background imaging time T1, instead of being determined in accordance with the received light amount of the currently acquired background information as described above.

Further, as described above, the projection imaging time T2 is set in such a manner that the received light amount CP1 with the light PL radiated may not exceed the saturated received light amount LM. However, the projection imaging time T2 may alternatively be set in such a manner that the received light amount CP1 exceeds the saturated received light amount LM within a range in which the received light amount $C2h$ of the background does not exceed the saturated received light amount LM. Also in this case, a part of the received light amount of the radiated light is added to the radiated light image information picked up in the radiated light imaging time T2. Therefore, the received radiation light amount CP can be extracted by accumulating the information.

Accordingly, the above-described embodiments have been described in order to allow easy understanding of the invention and do not limit the invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A light detecting apparatus comprising:
   an imaging unit configured to pick up an image;
   a projector configured to radiate light in a predetermined range of the image;
   a first storage unit configured to store background information acquired by at least one imaging operation in the predetermined range with no light radiated;
   a second storage unit configured to store projection information acquired by at least two imaging operations in the predetermined range with the light radiated; and
   a light reception processor configured to extract radiated light from the projection information based on the background information stored in the first storage unit and the projection information stored in the second storage unit; and wherein the light reception processor is further configured to determine a complementary received light amount corresponding to a received light amount of a background information included in the projection information based on the received light amount and an imaging time of the background information included in the projection information and based on the imaging time and a number of times of imaging operations of the projection information, and to extract the radiated light by subtracting the complementary received light amount from a received light amount of the projection information.

2. The light detecting apparatus according to claim 1, further comprising:
   an operation control part configured to set a projection imaging time with a light-receiving element not saturated at a portion where the light radiated from the projector is superposed on a background.

3. A vehicle incorporating the light detecting apparatus according to claim 1.

4. The vehicle according to claim 3 wherein the projector is positioned to radiate the light ahead of the vehicle, the light serving as a reference of a relative distance from the vehicle; and the imaging unit is mounted so that an area in front of the vehicle is the predetermined range.

5. A light detecting apparatus comprising:
   an imaging unit configured to pick up an image;
   a projector configured to radiate light in a predetermined range of the image;
   a first storage unit configured to store background information acquired by at least one imaging operation in the predetermined range with no light radiated;

a second storage unit configured to store projection information acquired by at least two imaging operations in the predetermined range with the light radiated; and a light reception processor configured to extract radiated light from the projection information based on the background information stored in the first storage unit and the projection information stored in the second storage unit; and wherein the imaging unit is configured to acquire the background information for a predetermined time within a single operation cycle and to acquire the background information and plural items of the projection information for a remaining time after the lapse of the predetermined time in the single operation cycle.

6. The light detecting apparatus according to claim 5 wherein the imaging unit is further configured to:

set the predetermined time to not more than one half of the single operation cycle in a range with no pixel saturated in accordance with a received light amount of previously-acquired background information; and perform a plurality of imaging operations for a remaining time of the single operation cycle in a range with no light-receiving element saturated by a background light amount in accordance with a received light amount of currently-acquired background information.

7. A light detecting apparatus comprising:

means for picking up an image including:

means for acquiring the background information for a predetermined time within a single operation cycle and for acquiring the background information and plural items of the projection information for a remaining time after the lapse of the predetermined time in the single operation cycle;

means for setting the predetermined time to not more than one half of the single operation cycle in a range with no pixel saturated in accordance with a received light amount of previously-acquired background information; and means for performing a plurality of imaging operations for a remaining time of the single operation cycle in a range with no light-receiving element saturated by a background light amount in accordance with a received light amount of currently-acquired background information;

means for radiating light in a predetermined range of the image;

first storage means for storing background information acquired by at least one imaging operation in the predetermined range with no light radiated;

second storage means for storing projection information acquired by at least two imaging operations in the predetermined range with the light radiated; and light processor means for extracting radiated light from the projection information based on the background information stored in the first storage means and the projection information stored in the second storage means.

8. A light detecting method comprising:

picking up an image;

radiating light in a predetermined range of the image;

storing projection information acquired by at least one imaging operation in the predetermined range with no light radiated;

storing the background information acquired by at least two imaging operations in the predetermined range with light radiated;

determining a complementary received light amount corresponding to a received light amount of a background information included in the projection information based on the received light amount and an imaging time of the background information included in the projection information and based on the imaging time and a number of times of imaging operations of the projection information; and extracting radiated light from the projection information based on the background information and the light projection information by subtracting the complementary received light amount from a received light amount of the projection information by a light reception processor.

9. The method according to claim 8, further comprising:

acquiring the background information for a predetermined time within a single operation cycle;

setting the predetermined time to less than or equal to one half of the single operation cycle in a range with no pixel saturated in accordance with a received light amount of previously-acquired background information; and acquiring the background information and plural items of the projection information for a remaining time after the lapse of the predetermined time in the single operation cycle by performing a plurality of imaging operations for the remaining time in a range with no light-receiving element saturated by a background light amount in accordance with a received light amount of currently-acquired background information.

10. The method according to claim 8, further comprising:

setting a projection imaging time with a light-receiving element not saturated at a portion where the light radiated is superposed on a background.

11. A light detecting method comprising:

picking up an image;

radiating light in a predetermined range of the image;

storing projection information acquired by at least one imaging operation in the predetermined range with no light radiated;

storing the background information acquired by at least two imaging operations in the predetermined range with light radiated;

extracting radiated light from the projection information based on the background information and the light projection information;

acquiring the background information for a predetermined time within a single operation cycle; and acquiring the background information and plural items of the projection information for a remaining time after the lapse of the predetermined time in the single operation cycle by a light reception processor.

12. The method according to claim 11, further comprising:

setting the predetermined time to not more than one half of the single operation cycle in a range with no pixel saturated in accordance with a received light amount of previously-acquired background information; and performing a plurality of imaging operations for a remaining time of the single operation cycle in a range with no light-receiving element saturated by a background light amount in accordance with a received light amount of currently-acquired background information.

* * * * *